United States Patent Office 2,873,299
Patented Feb. 10, 1959

2,873,299

HALOMETHYLATION OF AROMATIC COMPOUNDS

Louis A. Mikeska, Westfield, N. J., assignor to Esso Research and Engineering Company, a corporation of Delaware No Drawing. Application December 9, 1954
Serial No. 474,295

6 Claims. (Cl. 260—651)

This invention relates to a novel process for the preparation of halomethylated aromatic compounds, particularly bis (chloromethyl) durene.

This application is a continuation-in-part of copending application Serial No. 280,366, filed April 3, 1952, now abandoned, which in turn is a continuation-in-part of application Serial No. 202,400, filed December 22, 1950, and since abandoned.

Bis (chloromethyl) durene is an extremely useful product. It serves as an intermediate in the preparation of a large number of high molecular weight linear polymers useful as resins, synthetic lubricants, synthetic fibers and lubricating oil addition agents. The compound, bis (chloromethyl) durene, has the structural formula illustrated below:

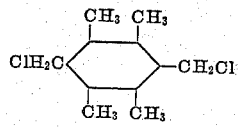

Bis (chloromethyl) durene is unique among members of the polymerizable types of compounds in that it has no reactive position within the molecule other than the two chloromethyl groups. This automatically leads to the formation of linear polymers, as there are no vulnerable positions open which would permit of undesirable cross-linking. Other bis (chloromethyl) aromatics, such as the benzene and xylene derivatives, and particularly the symmetrical derivatives such as 1,4-dimethyl-2,5-dichloromethyl benzene, are also useful, but to a more limited extent since they contain reactive positions in the benzene nucleus which permit of cross-linking of the polymers.

In addition to its unreactive nucleus, bis (chloromethyl) durene is also unique in the preparation of high molecular weight linear polymers in that higher homologues, e. g., bis (chloroethyl) durene, bis (chloropropyl) durene, etc., are subject to dehydrohalogenation and are, therefore, greatly restricted in the types of polymers obtainable from the same. These higher homologues are also more difficult to prepare and are consequently produced in lesser yields. Broadly speaking, therefore, this invention is applicable to the bis-halomethylation or bis-chloromethylation of aromatic hydrocarbons having 1 to 4 methyl substituents attached to a benzene nucleus, but is particularly valuable in connection with symmetrical compounds such as para-xylene and notably durene.

Some bis-chloromethyl aromatics such as bis-chloromethyl xylene can be prepared by treating the aromatic at 45°–60° C. with a mixture of aqueous formaldehyde and concentrated hydrochloric acid. Condensation of aromatics with trioxymethylene in an inert solvent such as chloroform in the presence of hydrogen chloride has also been used with some success, though the yields of bis chloromethyl derivatives under these conditions are generally poor. Even poorer yields of bis chloromethyl derivatives are obtained when aromatics are condensed with chloromethyl alkyl ethers in glacial acetic acid as a solvent.

Although the above statements hold for most aromatics, they are particularly true with respect to chloromethylation of durene, which is quite resistant to the formation of the bis-chloro derivative. For example, Rhoad and Flory (J. A. C. S. 72: 2216 (1950)), using the formaldehyde-conc. hydrochloric acid method, had to recycle their unchloromethylated or partly chloromethylated durene six times in order to obtain an 80% yield of the crude product, or 67% yield of pure bis-chloromethyl durene. Similarly, when chloroform is used as a solvent in the condensation of chloromethyl-alkyl ether with durene in the presence of zinc chloride on basis of once through operation, a yield of about 25% of bis-chloromethyl durene is usually obtained together with 60 to 70 percent of the mono-chloromethyl derivative.

Bis (chloromethyl) durene has most preferably been prepared by the reaction between durene and a chloromethyl alkyl ether having the general formula ROCH$_2$Cl, where R is an alkyl group of 1 to 12 carbon atoms. This chloromethylation reaction takes place according to the following equation:

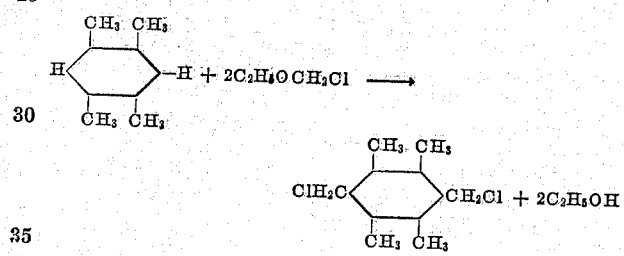

However, the yields obtained by this reaction normally are quite low, even in the presence of inert solvents. The low yields appear to be due to a side reaction between the chloromethyl alkyl ether reagent and the alcohol formed in the main chloromethylation reaction. This side reaction tends to form ethylal in the process and thereby consumes half the chloromethyl ether. Consequently, heretofore it has been customary to use the chloromethyl ether in an excess of about 100 to 150% over that theoretically required for the desired chloromethylation of the aromatic feed. The excess ether is consumed in the following side reaction:

It has now been found that this wasteful loss of chloromethylating agent can be avoided by carrying out the chloromethylation in the presence of a sufficient amount of an acylating agent capable of firmly typing up the liberated alcohol; e. g. an organic acid anhydride or acid halide. A particularly outstanding compound for this purpose is acetic anhydride. However, other aliphatic anhydrides such as propionic acid anhydride, chloroacetic acid anhydrides, beta-chloropropionic acid anhydride, or halides such as acetyl chloride are similarly useful.

When a strong acylating agent such as acetic anhydride is used in the reaction instead of or in addition to chloroform or other conventional inert or incompletely reactive solvents, the ethyl alcohol which is formed during the first step of the reaction reacts completely with the acylating agent to form ethyl ester. Thus the chloromethyl ethyl ether is enabled to carry this reaction to completion, without being consumed in any side reaction.

It is realized that small amounts of monocarboxylic acids such as formic and acetic have been heretofore used in connection with certain monochloromethylation reactions described in Patent No. 2,569,409, and that acid anhydrides have also been obliquely suggested in the same connection. In this prior practice the acids and anhydrides were considered as full equivalents and were suggested simply as incidental components of a catalyst mixture being used in conjunction with formaldehyde and hydrogen chloride as the chloromethylation agent.

Unlike the chloromethyl alkyl ethers used in the present invention, which produce alcohol as a parasitic by-product, the only significant by-product of the formaldehyde and hydrogen chloride used in the prior process is comparatively harmless water which does not use up any of the principal reagents and consequently does not require any special precautions. Moreover, even if a chloromethyl alkyl ether were used in the prior process as the chloromethylation agent, the prior art had no teaching whatever as to any particular relation between the amounts of principal reagents used and the amount of acetic acid present in the catalyst mixture. Free acid has been found useless for the present purposes since it does not esterify the alcohol completely but gives an equilibrium mixture which contains substantial amounts of free alcohol and thereby defeats the main purpose of this invention. Furthermore, even if acetic anhydride were actually substituted for the acetic acid used in the prior process, the small amount of anhydride used would be altogether insufficient to react with all the alcohol formed from the chloromethylation agent.

It has now been found that even the anhydrides or other acylating agents are ineffective unless used in a sufficient ratio in excess of a certain stoichiometric minimum. This critical ratio has been found to equal a minimum of 2 moles of acylating agent per mole of durene or other aromatic hydrocarbon being bis-choloromethylated, ratios of about 2 to 2.5 moles per mole of aromatic hydrocarbon or about 1.5 to 2 parts by weight of acetic anhydride per part of durene, being particularly effective.

The aromatic hydrocarbons used herein are well-known materials. Durene itself, which constitutes the most valuable species, is a well-known solid material obtained normally from petroleum sources by fractional crystallization or the like. A high state of purity is extremely important for the production of high quality resins and accordingly it is desirable to use the aromatic hydrocarbons at least 97% pure, preferably at least 99% pure. In carrying out the present invention, the durene or other aromatic hydrocarbon is usually present in solution in the acylating agent, with or without the aid of an additional solvent such as chloroform.

Halomethyl alkyl ethers are well known in the art. They are prepared, in general, according to the reaction indicated below, wherein R is an alkyl group and X is chlorine or another halogen such as bromine or iodine:

$$HCHO + ROH + HX \rightarrow ROCH_2X + H_2O$$

The chloromethyl ethers wherein R, the alkyl radical, has from 1 to 5 carbon atoms, i. e., the methyl, ethyl, propyl, butyl and amyl chloromethyl ethers, are particularly useful in this invention. Those ethers wherein the R has up to 12 carbon atoms are normally liquid and are, therefore, easiest to handle, but solid ethers can also be utilized in the presence of a suitable solvent. The chloromethyl ether is used in a ratio of at least 2 moles per mole of aromatic hydrocarbon, ratios of 2:1 to 3:1 being preferred.

The reaction is carried out in liquid phase utilizing an anhydrous system to prevent hydrolysis of the chloromethyl ether used. Atmospheric pressure is therefore usually employed, though moderate superatmospheric pressures may be utilized to keep the system in the liquid phase when chloromethylmethyl ether or low boiling solvents are employed. The temperatures employed are consequently those that maintain the system in the liquid phase, i. e., normally in the range of 20° to 150° C. depending upon the chloromethyl ether; temperatures between about 50° and 60° C. are preferred in the case of chloromethyl ethyl ether. The reaction rate increases with rise in temperature, but higher reaction temperatures favor the formation of polymers and other undesirable products.

Catalysts are most advantageous in facilitating the reaction. Zinc chloride and stannic chloride are particularly effective. Other Friedel-Crafts and acid condensation catalysts, such as concentrated sulfuric acid, may also be employed and the reaction will proceed slowly even without catalyst. In general, however, about 0.03 to 0.15 mole of catalyst per mole of aromatic hydrocarbon, e. g. 10 grams $ZnCl_2$ per 134 grams durene, gives excellent results in the present invention. Excessive catalyst concentrations may cause unwanted condensation reactions. It can be seen that the catalyst requirement is surprisingly low in comparison with earlier chloromethylation methods, particularly those which evolve water in the course of the reaction.

Inert solvents for the reactants are optional, but their employment is desirable to assure easy stirring of the reaction mixture. Most inert, non-alcoholic aliphatic organic solvents are useful and include hydrocarbons such as petroleum naphtha or petroleum ether; or halogenated solvents such as chloroform or ethylene dichloride; or ethers such as diethyl ether or dioxane and the like.

This invention will be better understood by reference to the following examples of the preparation of the indicated compound according to the process of this invention.

Example 1

A three-way flask equipped with a stirrer, a return condenser and a thermometer, was charged with 134 parts durene (99% pure), 200 parts chloromethyl ethyl ether, and 202 parts acetic anhydride, and the durene was allowed to dissolve. On addition of 10 parts of zinc chloride to the above reactants, the temperature rose spontaneously from 25° C. to 38° C. The temperature was then raised to 50° C. by application of external heat, and was maintained at 50° C. to 60° C. for two hours.

As the reaction proceeded, a solid began to separate from the reaction mixture. On completion of the reaction, 200 parts of water was added and the mixture was stirred for 30 minutes at 60° C. in order to decompose any unchanged chloromethyl ethyl ether which might have been present. On cooling, the product solidified. On filtration, 206 grams of air-dried product were obtained.

In order to separate the monochloromethyl derivative from the bis-chloromethyl component, the product was extracted several times with petroleum ether. The petroleum ether insoluble fraction, which consisted of pure bis-chloromethyl durene (M. P. 194° C.) weighed 141 grams. This corresponds to 61 mole percent yield. On evaporation of the petroleum ether filtrates, a white solid material was obtained which was found to consist of essentially pure monochloromethyl durene. The product weighed 58 grams and corresponded to 32 mole percent yield.

Example 2

A three-way flask equipped with a stirrer, a return condenser, and a thermometer was charged with 650 grams (6.25 moles) of chloromethyl ethyl ether, 90 grams of pulverized zinc chloride, and 600 cc. of chloroform. Then while stirring 402 grams (3 moles) of pure crystalline durene was added slowly with sufficient cooling to keep the reaction temperature below 50° C. When all the durene had been added, the mixture was heated with stirring at 60° C. for three hours.

On completion of the reaction, 300 cc. of water were added and the mixture was stirred at 50° C. for one hour in order to decompose any unchanged chloromethyl ethyl ether.

The product was washed free of hydrochloric acid, dried over sodium sulfate, and the solvent was finally removed in an evaporating dish on the steam bath. The residue, which solidified on standing, weighed 595 grams.

This product was extracted several times with petroleum ether in order to remove the monochloromethyl durene. The petroleum ether insoluble material which represented the major part of the bis-chloromethyl durene formed weighed 112 grams. This corresponds to a yield of 11.2 mole percent of the dichloromethyl and 86.3 mole percent of the monochloromethyl durene.

A comparison of these yields with those obtained in Example 1 shows the superiority of the acetic anhydride method. This superiority is particularly striking when it is realized that the catalyst concentration was about three times higher in Example 2 than in Example 1.

*Example 3*

When Example 2 was repeated, except that acetic acid was used instead of chloroform, similarly poor results were obtained in contrast to the excellent results of Example 1.

A large variety of derivatives can be prepared from bis (chloromethyl) durene. Most of these derivatives can be polymerized to obtain high molecular weight linear polymers useful for the properties enumerated above.

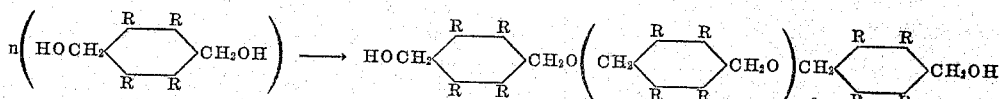

These derivatives are illustrated below where R represents a methyl group.

1. *Polyesters.*—The bis(chloromethyl)durene can be readily converted to the corresponding diol, i. e. bis-(hydroxymethyl)durene, by treatment with alkali such as potassium hydroxide or with a salt of an appropriate acid such as sodium acetate. In the first instance the diol is obtained directly, whereas in the second case a diester, bis(acetoxymethyl)durene, is obtained which may be hydrolyzed to the diol, as described, for instance, in copending application Serial No. 446,974, filed July 30, 1954.

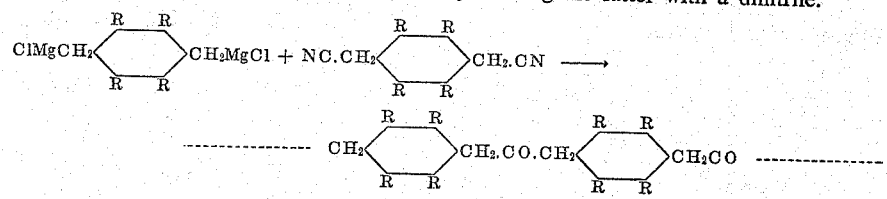

On esterification of the diol with polybasic acids, polyesters are obtained as described and claimed in copending application Serial No. 452,722, filed August 27, 1954.

Another series of polyesters can be obtained in the following manner:

The bis(chloromethyl)durene is converted to a diol as described above. On fusion of the diol with alkali, a dibasic acid is obtained.

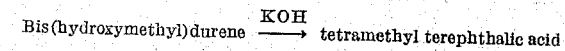

On esterification of the above-described diacid with diols or polyols, polyesters are obtained.

Other aromatic diacids and polyesters derived therefrom are described and claimed in copending application Serial No. 401,436, filed December 30, 1953.

Still another series of polyesters can be obtained in the following manner:

The bis(chloromethyl)durene is condensed with an alkalicyanide to yield a dinitrile.

Bis(chloromethyl)durene+2KCN→
bis(cyanomethyl)durene+2KCl

On conversion of the nitrile to the corresponding dibasic acid, and on esterification of the latter with glycols or polyols, polyesters are obtained.

Polythioesters can be derived from bis (mercaptomethyl) durene as described and claimed in copending application Serial No. 405,255, filed January 20, 1954.

2. *Polyethers.*—Polyethers can be obtained by condensing the diol with itself in the presence of acid catalysts:

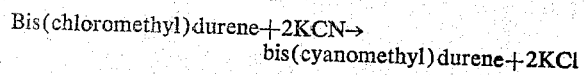

3. *Polysulfides.*—Polysulfides are obtained on condensation of the bis (chloromethyl) durene with alkali sulfides.

Another series of polysulfides can be obtained by oxidizing the dimercaptan with iodine or some other oxidizing agent or by condensing the dimercaptan with sulfur chloride.

4. *Polyketones.*—Polyketones can be obtained by converting bis (chloromethyl) durene into a Grignard derivative and by treating the latter with a dinitrile.

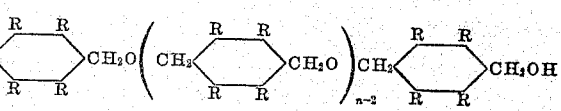

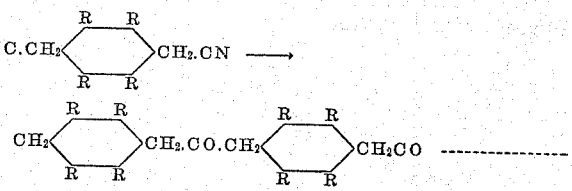

5. *Polyglycols.*—Polyglycols are obtained on condensing the Grignard derivative with a diketone.

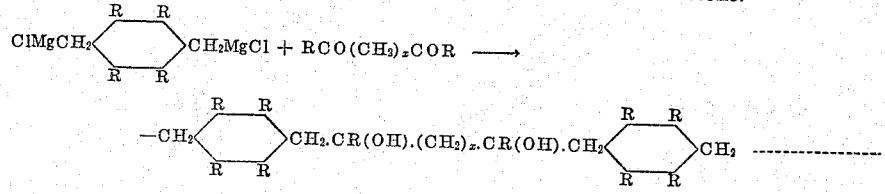

6. *Polyamides.*—Polyamides are obtained on condensation of the diacids with any diamine.

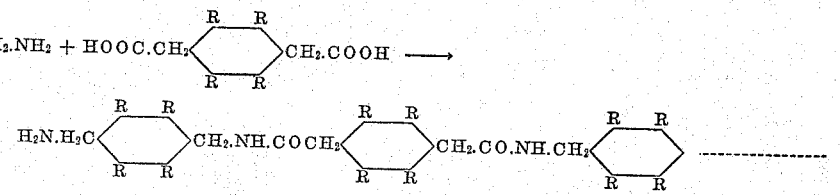

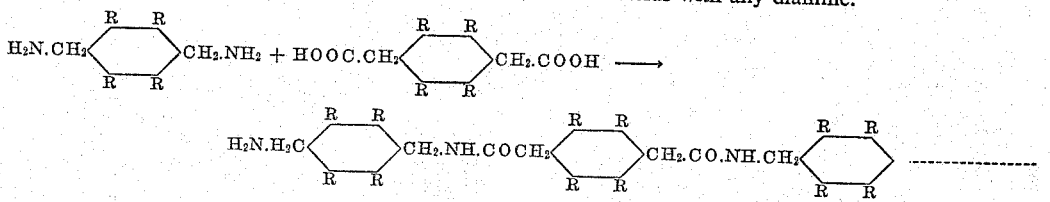

Other polyamides are described, for instance, in copending application Serial No. 418,471, filed March 24, 1954.

7. *Polyureas.*—Polyureas are obtained on conversion of the diamine to a diisocyanate and by condensing the latter with a diamine.

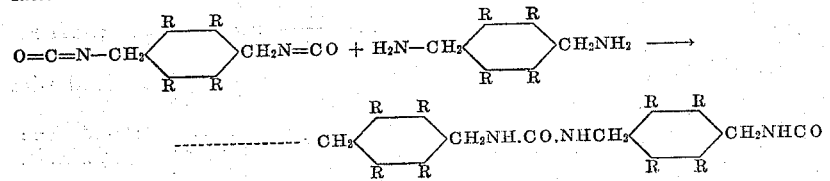

8. *Polyurethanes.*—Polyurethanes can be obtained by treating the diisocyanate with a glycol.

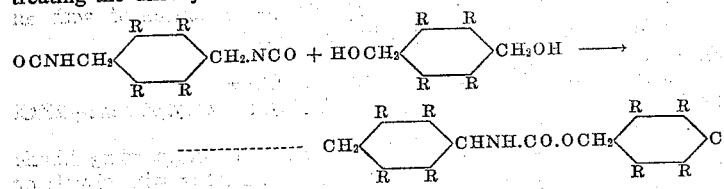

This invention has been described with respect to specific embodiments, but it is not intended to be limited thereby.

What is claimed is:

1. A process for preparing bis (halomethyl) aromatic compounds which comprises reacting a benzene hydrocarbon with at least 2 moles per mole of hydrocarbon of a halomethyl alkyl ether having the general formula, $ROCH_2X$, wherein R is an alkyl group and X is a halogen selected from the group consisting of chlorine and bromine, in the liquid phase in the presence of at least 2 moles of an acylating agent per mole of benzene hydrocarbon, said acylating agent is selected from the group consisting of anhydrides and chlorides of monocarboxylic aliphatic acids of 2 to 3 carbon atoms.

2. A process as in claim 1 wherein the ether is a chloromethyl alkyl ether having 1 to 5 carbon atoms per alkyl group, and the reaction is carried out at a temperature in the range of 20° to 150° C.

3. A process as in claim 2 wherein the hydrocarbon is durene, the acylating agent is acetic anhydride, and wherein the reaction is carried out in the presence of a Friedel-Crafts catalyst.

4. A process for preparing a symmetrical bis (chloromethyl) aromatic compound which comprises reacting an aromatic hydrocarbon of the class consisting of p-xylene and durene with about 2 to 3 moles of chloromethyl ethyl ether per mole of aromatic hydrocarbon in the liquid phase in the presence of at least about 2 moles of acetic anhydride per mole of aromatic hydrocarbon and in the presence of a Friedel-Crafts catalyst selected from the group consisting of zinc chloride and stannic chloride at a temperature between 20° C. and 150° C.

5. A process as in claim 4 wherein an inert aliphatic organic solvent is used in addition to the specified reagents.

6. A process for preparing bis (chloromethyl) durene which comprises mixing an aromatic hydrocarbon feed consisting of durene with 2.1 to 3 moles of chloromethyl ethyl ether per mole of durene and with about 2 to 2.5 moles of acetic anhydride per mole of durene, thereby dissolving the durene, adding to the resulting solution about 0.03 to 0.15 mole of zinc chloride per mole of durene, and maintaining the resulting mixture in anhydrous liquid phase at reaction temperatures between 50° and 60° C.

References Cited in the file of this patent

UNITED STATES PATENTS

| | | |
|---|---|---|
| 2,469,334 | Hartough et al. | May 3, 1949 |
| 2,569,409 | De Benneville et al. | Sept. 25, 1951 |